US012631899B2

(12) United States Patent
Salles et al.

(10) Patent No.: US 12,631,899 B2
(45) Date of Patent: May 19, 2026

(54) METHOD FOR DETERMINING THE SHAPE OF A NOSE PAD TO BE PART OF AN OPHTHALMIC LENS

(71) Applicant: ESSILOR INTERNATIONAL, Charenton-le-Pont (FR)

(72) Inventors: Valérie Salles, Charenton-le-Pont (FR); Bruno Amir, Charenton le Pont (FR); Jean-Marc Padiou, Charenton le Pont (FR); Eric Gacoin, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 389 days.

(21) Appl. No.: 18/257,525

(22) PCT Filed: Dec. 17, 2021

(86) PCT No.: PCT/EP2021/086536
§ 371 (c)(1),
(2) Date: Jun. 14, 2023

(87) PCT Pub. No.: WO2022/129550
PCT Pub. Date: Jun. 23, 2022

(65) Prior Publication Data
US 2024/0045229 A1 Feb. 8, 2024

(30) Foreign Application Priority Data
Dec. 18, 2020 (EP) ..................................... 20306618

(51) Int. Cl.
| | |
|---|---|
| *G02C 5/12* | (2006.01) |
| *G02C 7/02* | (2006.01) |
| *G02C 13/00* | (2006.01) |

(52) U.S. Cl.
CPC ............. *G02C 5/126* (2013.01); *G02C 7/027* (2013.01); *G02C 13/005* (2013.01); *G02C 2200/08* (2013.01)

(58) Field of Classification Search
CPC ................................ G02C 5/126; G02C 7/027
See application file for complete search history.

(56) References Cited

U.S. PATENT DOCUMENTS

| | | | |
|---|---|---|---|
| 6,082,857 | A | 7/2000 | Lockhart |
| 9,310,521 | B2 | 4/2016 | Meschenmoser et al. |

(Continued)

FOREIGN PATENT DOCUMENTS

| | | |
|---|---|---|
| JP | 3167304 U | 4/2011 |
| WO | 2013131950 A1 | 9/2013 |
| WO | 2015151955 A1 | 10/2015 |

OTHER PUBLICATIONS

International Search Report and Written Opinion of the ISA for PCT/EP2021/086536 mailed Apr. 12, 2022, 12 pages.

*Primary Examiner* — Sanghyuk Park
(74) *Attorney, Agent, or Firm* — NIXON & VANDERHYE

(57) ABSTRACT

Disclosed is a method, for example implemented by a computer, for determining the shape of a nose pad, to be part of an ophthalmic lens intended to be worn by a wearer, the method including: receiving lens shape data relating at least to the shape of an ophthalmic lens; receiving morphology data relating at least to the morphology of the nose of the wearer; and determining the shape of the nose pad intended to be part of the ophthalmic lens intended to be worn by the wearer based at least on the lens shape data and morphology data.

13 Claims, 4 Drawing Sheets

(56)                    References Cited

U.S. PATENT DOCUMENTS

| 9,429,773 B2 | 8/2016 | Ben-shahar | |
| 2005/0270475 A1* | 12/2005 | Curci | G02C 5/126 |
| | | | 351/69 |
| 2010/0177275 A1 | 7/2010 | Kastner | |
| 2016/0033772 A1* | 2/2016 | Han | H04N 1/6083 |
| | | | 359/630 |
| 2016/0054583 A1* | 2/2016 | Berthelot | G02C 5/122 |
| | | | 351/137 |
| 2018/0017815 A1 | 1/2018 | Chumbley et al. | |
| 2019/0337230 A1 | 11/2019 | Kauffmann | |
| 2019/0344396 A1 | 11/2019 | Gacoin et al. | |
| 2020/0142224 A1 | 5/2020 | Schwarz et al. | |

* cited by examiner

3

1

5

4

2

13

11

15

14

12

31b

35

31c

32

30

11b

33

34

11a

31a

METHOD FOR DETERMINING THE SHAPE OF A NOSE PAD TO BE PART OF AN OPHTHALMIC LENS

This application is the U.S. national phase of International Application No. PCT/EP2021/086536 filed Dec. 17, 2021 which designated the U.S. and claims priority to EP 20306618.8 filed Dec. 18, 2020, the entire contents of each of which are hereby incorporated by reference.

FIELD OF THE DISCLOSURE

The disclosure relates to a method for determining the shape of a nose pad to be part of an ophthalmic lens. The disclosure further relates to an ophthalmic lens having an incorporated nose pad.

BACKGROUND OF THE DISCLOSURE

It is known to have a spectacle frame including a nose resting portion configured to be fitted on the nose of the wearer and to retain the eyewear equipment on the head of the wearer. The nose resting portion is formed on the spectacle frame to guarantee a positioning of the eyewear equipment with respect to the face of the wearer, wherein the ophthalmic lenses are facing the eye of the wearer.

It is also known to use deported nose pad extending from a portion of the spectacle frame. The deported nose pad comprising an arm extending at its first end from an extremity of a spectacle frame and the arm comprising a second end carrying a plastic pad forming the resting portion of the nose pad.

The deported nose pad position may be modified upon manipulations of the eyewear equipment.

It is known to produce nose pad integrated within the spectacle frame or deported but these nose pads are standard and not adapted to the morphology of the face of every wearer.

There is a need to provide an eyewear equipment which could be adapted to a specific wearer, wherein resting portion prohibits the eyewear equipment to slip on the nose of the wearer and while wearing the eyewear equipment being comfortable.

Additionally, there is a need to guarantee a correct wear of the eyewear equipment regardless of the activity done by the wearer, such as reading on a couch or practicing sport.

There is also a need to provide an optimized eyewear equipment positioning especially progressive addition and single vision lenses correcting myopia to ensure a good positioning and wearing conditions of the ophthalmic lens with respect to the eyes of the wearer.

SUMMARY OF THE DISCLOSURE

To this end, the disclosure proposes a method, for example implemented by computer means, for determining the shape of a nose pad to be part of an ophthalmic lens intended to be worn by a wearer, the method comprising:

receiving lens shape data relating at least to the shape of an ophthalmic lens, receiving morphology data relating at least to the morphology of the nose of the wearer, determining the shape of the nose pad intended to be part of the ophthalmic lens intended to be worn by the wearer based at least on the lens shape data and morphology data.

Advantageously, such method allows customizing a nose pad enabling aesthetic and discreet eyewear equipment being non slippery and comfortable, taking into account the morphology of the nose of the wearer. Taking into consideration the morphology of the wearer enables to provide a tailor-made solution.

Indeed, the nose pad is determined to be adapted to the morphology of the wearer.

The ophthalmic lens having such a nose pad is also particularly adapted to provide stable and optimized position of the lenses such as progressive addition lenses or single vision lenses.

Additionally, the ophthalmic lens including a nose pad facilitates the eyewear equipment manufacturing process. It is no longer required to produce frames forming nose pads or comprising deported nose pads comprising an arm fixed on the lens or the frame.

This method enables to provide an eyewear equipment rightly fitted with respect to the wearer face without requiring a large number of pieces and their respective stock. Half-rim or rimless frames solely require a connecting rod connecting the two ophthalmic lenses of the eyewear equipment. This connecting rod does not require anymore to have a specific shape to form the nose pads or to carry deported nose pads. The manufacturing process to produce eyewear equipment comprising half-rim or rimless frames is facilitated.

According to further embodiments which can be considered alone or in combination:

the morphology data further comprise nose front angle and/or splay angle and/or nasal width and/or nasal height and/or nasal length and/or cheekbone shape and/or cheekbone position, and/or eyebrows height data; and/or receiving wearer's wearing conditions such as pantoscopic angle or eye-lens distance or the positioning of the lens with respect to the face of the wearer; and/or determining the shape of the nose pad so as to have a balance of the ophthalmic lens on the wearer's face when the ophthalmic lens is worn by the wearer, and wherein the balanced ophthalmic lens is substantially horizontal; and/or the nose shape is determined so as to prevent contact of the ophthalmic lens with at least one cheekbone and/or at least one eyebrow of the wearer, when the ophthalmic lens is worn by the wearer; and/or the nose pad and the ophthalmic lens are made of the same material; and/or the nose pad and the ophthalmic lens have the same colored tint; and/or the nose pad is intended to be formed integrally with the ophthalmic lens; and/or the nose pad is intended to be formed on a portion of the ophthalmic lens; and/or the shape of the nose pad is selected within a list of predetermined nose pad shapes based on the wearer's morphology data; and/or the ophthalmic lens intended to be worn by the wearer and the nose pad are manufactured as a one-piece element; and/or the nose pad is manufactured successively of the ophthalmic lens intended to be worn by the wearer, the ophthalmic lens being manufactured independently of the nose pad; and/or the ophthalmic lens shape data comprise the contour of the ophthalmic lens defining the portion joining the front and the back surfaces of the ophthalmic lens over the perimeter of the ophthalmic lens and/or the curvature of the back surface of the ophthalmic lens and/or the curvature of the front surface of the ophthalmic lens and/or the shape and contour of the nasal portion of the ophthalmic lens; and/or the method further comprises determining an optimized ophthalmic lens shape based on lens shape data of an initial ophthalmic lens free of nose pad, the optimized ophthalmic lens comprising the nose pad; and/or the shape of the initial ophthalmic lens and/or the contour, defining the portion joining the front and the back surfaces configured to be in vicinity of the nose of the wearer when the initial ophthalmic lens is worn by the wearer, is modified by the shape and contour of the nose pad; and/or the nose pad comprises a nose pad fixation portion, which is determined to be fixed on a receiving portion of the ophthalmic lens intended to be worn by the wearer; and/or the nose pad fixation portion has a shape determined to be complementary with the shape of the receiving portion of the ophthalmic lens configured to receive the nose pad; and/or the nose pad is intended to be formed on the back surface or a nasal portion of the ophthalmic lens; and/or determining the shape of the ophthalmic lens and the nose pad comprises a virtual positioning of the ophthalmic lens comprising the nose pad relative to the face of the wearer.

According to a further aspect, the disclosure further relates to a method for manufacturing a nose pad according to the disclosure.

According to a further aspect, the disclosure further relates to an ophthalmic lens intended to be worn by a wearer comprising a portion protruding forming a nose pad, the protruding portion forming the nose pad may have a shaped defined based on at least wearer morphologic data relating at least to the morphology of the nose of the wearer.

Advantageously, the ophthalmic lens comprises a nose resting portion formed by a nose pad which is designed to be adapted to a specific wearer to be rightly fitted on the nose of the wearer.

According to further embodiments which can be considered alone or in combination:

the morphology data further comprise nose front angle and/or splay angle and/or nasal width and/or nasal height and/or nasal length and/or cheekbone shape and/or cheekbone position, and/or eyebrows height data; and/or the shape of the nose pad is configured to guarantee a balance of an ophthalmic lens on the wearer's face when the ophthalmic lens is worn by the wearer, and wherein the balanced ophthalmic lens is substantially horizontal; and/or the nose shape is configured to prevent contact of the ophthalmic lens with at least one cheekbone and/or at least one eyebrow of the wearer, when the ophthalmic is worn by the wearer; and/or the nose pad protrudes from the ophthalmic lens back surface; and/or the nose pad protrudes from the ophthalmic lens nasal portion; and/or the ophthalmic lens and the nose pad are made of the same material.

According to a further aspect, the disclosure further relates to a nose pad configured to be formed directly on an ophthalmic lens intended to be worn by a wearer, wherein the nose pad is determined based at least on a wearer's morphology data.

Advantageously, the nose pad which is designed to be adapted to a specific wearer to be rightly fitted on the nose of the wearer.

According to further embodiments which can be considered alone or in combination:

the nose pad has a shape determined based at least on an ophthalmic lens shape data and morphology data of the ophthalmic lens wearer, the morphologic data comprising at least data relating to the morphology of the nose of the wearer; and/or the morphology data further comprise nose front angle and/or splay angle and/or nasal width and/or nasal height and/or nasal length and/or cheekbone shape and/or cheekbone position, and/or eyebrows height data; and/or the nose pad comprises a fixation portion, the fixation portion having a surface configured to have a complementarity shape with a receiving portion of an ophthalmic lens intended to be worn by a wearer.

BRIEF DESCRIPTION OF THE DRAWINGS

Embodiments of the disclosure will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help improve the understanding of the embodiments of the present disclosure.

DETAILED DESCRIPTION OF PREFERRED EMBODIMENTS

Figures 1, 2, 3:
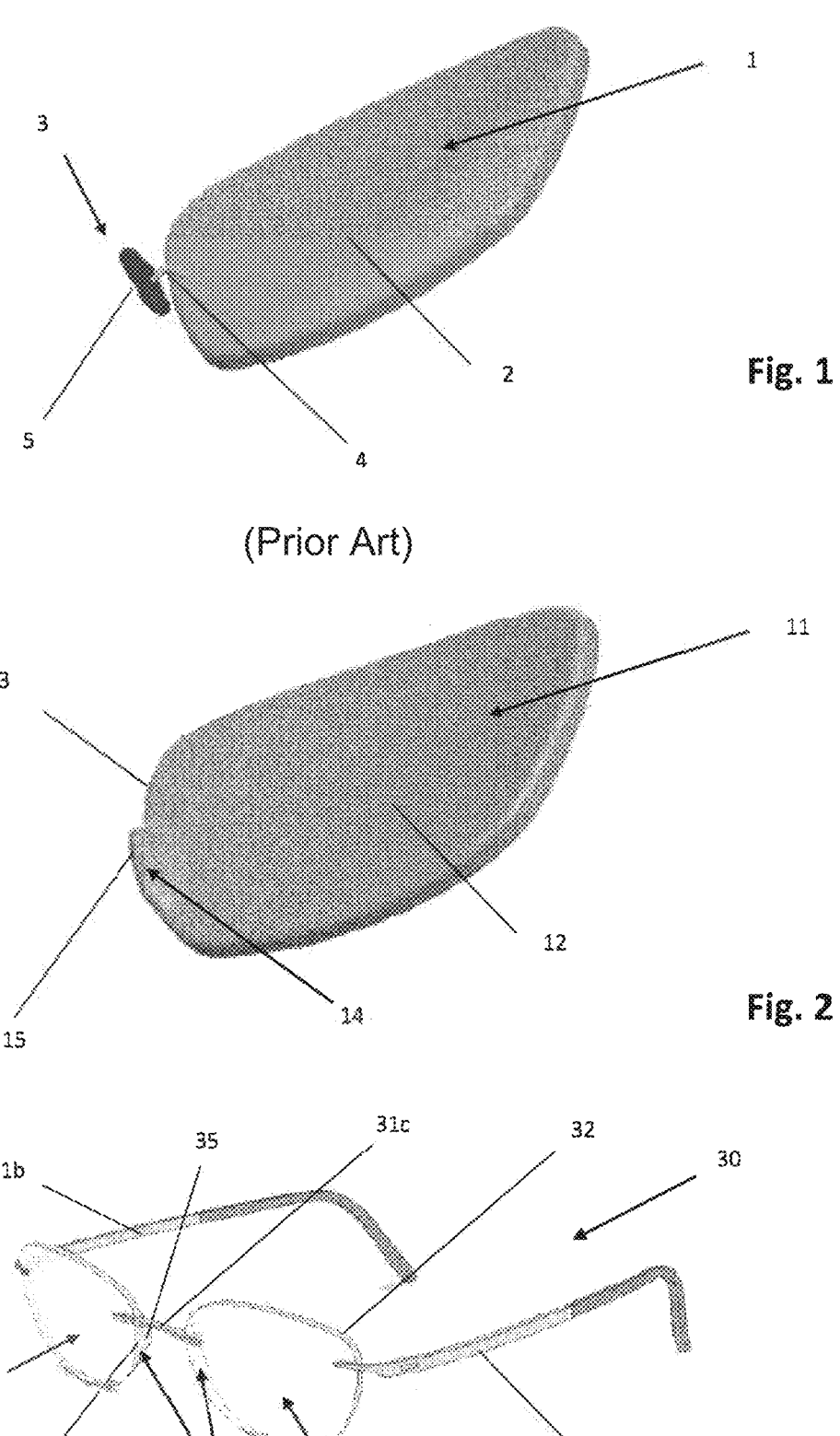
FIG. 1 is a diagram of an ophthalmic lens comprising a deported nose pad according to the prior art.
FIG. 2 is a diagram of an ophthalmic lens comprising a nose pad according to the disclosure.
FIG. 3 is a perspective view of an eyewear equipment according to the disclosure according to a first embodiment.

FIG. 1 illustrates an ophthalmic lens 1 configured to be used in an eyewear equipment, the ophthalmic lens 1 comprising a back surface 2. The ophthalmic lens comprises a deported nose pad 3 formed by an arm 4 and plastic pad 5. The arm 4 is fixed at a first extremity to the back surface 2 and to the pad 5 at a second end. The arm 4 often requires to be shaped to provide a positioning of the pad with respect to the nose of the eyewear equipment wearer. The arm 4 of the deported nose pad 3 is shaped with respect to the shape of a standard wearer.

In such manner an ophthalmic lens comprising a deported nose pad according to the prior art may not be adapted to a specific wearer.

The arm 4 wearing the pad being thin is also at risk to be deformed over time based on the manipulation of the wearer. The nose pad may over time not even be adapted to rest on the nose of a standard wearer.

Additionally, the wearer may have a smaller nose than the standard wearer and the eyewear equipment may slip over the nose of the eyewear equipment wearer.

FIG. 2 illustrates an ophthalmic lens 11 according to the disclosure, the ophthalmic lens 11 being configured to be used in an eyewear equipment. The ophthalmic lens 11 comprises a back surface 12 and a nasal portion 13. The ophthalmic lens 11 comprises a nose pad 14 protruding from a portion of the ophthalmic lens 11.

The nose pad 14 may protrude from the back surface 12 and/or the nasal portion 13 of the ophthalmic lens 11. As illustrated in FIG. 2, the nose pad protrudes from the back surface 12 of the ophthalmic lens 11 in vicinity of the nasal portion 13.

The nose pad 14 may protrude substantially perpendicularly from the back surface 12 of the ophthalmic lens 11.

The nose pad 14 comprises a nasal portion 15 being flush with the nasal portion 13 off the ophthalmic lens 11, forming a surface continuity. Said surface continuity formed by the nasal portions 13 and 15 being determined to rest on the nose of the eyewear equipment wearer.

The shape of a nose pad 14 intended to be part of an ophthalmic lens 11 intended to be worn by a wearer, is determined thanks to a method comprising:

receiving lens shape data relating at least to the shape of an ophthalmic lens 11, receiving morphology data relating at least to the morphology of the nose of the wearer, determining the shape of the nose pad 14 to be part of the ophthalmic lens 11 intended to be worn by the wearer based at least on the lens shape data and morphology data.

The wearer selects an eyewear equipment for which a nose pad 14 is to be provided on an ophthalmic lens to form an ophthalmic according to the disclosure. The ophthalmic lens 11 according to the disclosure will also be referred as optimized ophthalmic lens 11 with respect to an initial ophthalmic lens free of a nose pad 14.

The eyewear equipment comprises at least an initial ophthalmic lens, free of nose pad, having specific lens shape data The lens shape data of the ophthalmic lens comprise the contour of the ophthalmic lens defining the portion joining the front and the back surfaces of the ophthalmic lens over the perimeter of the ophthalmic lens and/or the curvature of the back surface of the ophthalmic lens and/or the curvature of the front surface of the ophthalmic lens and/or the shape and contour of the nasal portion of the ophthalmic lens defining the portion joining the front and the back surfaces configured to be in vicinity of the nose of the wearer when the ophthalmic lens is mounted on a common eyewear equipment worn by a wearer.

The morphology data further comprise nose front angle and/or splay angle and/or nasal width and/or nasal height and/or nasal length and/or cheekbone shape and/or cheekbone position, and/or eyebrows height data.

These morphology features are known by the person skilled in the art. These features are detailed here after.

The nose front angle is the angle formed between the nasal bridge and the forehead of the wearer.

The nose splay angle is the angle formed between the two sides of the nose.

The nasal width is the distance on a horizontal axis of the farthest ends of the nose of a wearer.

The nasal height is the distance between nasion and subnasale. It is also understood as the distance in a vertical direction between the farthest top and lower ends of the nose of a wearer.

The nasal length is the distance between the nasion and the tip of the nose.

The cheekbone shapes are defined according to the cheekbone prominence. The cheekbone prominence may also be considered as zygomatic prominence. The cheekbone prominence is defined as the enlargement of the zygomatic process of the temporal bone of the skull, which forms the middle and lateral inferior orbital margin.

Cheekbone comprises a most prominent part located under eye sockets.

Cheekbone shapes may be hollow, flat, slightly rounded (considered as normal), round (considered as plump), or protruding (considered as bony).

The eyebrows height is defined according to a vertical axis. The eyebrows height is the distance between the nasion and the lower end of the eyebrows.

The design of the ophthalmic lens may be influenced by the shape and/or the position of the cheekbone, and/or the position of the eyebrows. Morphologic data relative to the cheekbones may influence the pantoscopic angle.

The nose pad 14 is configured to be fitted on the nose of the wearer without slipping while prohibiting the ophthalmic lens 11 to be in contact with the cheekbone and/or the eyebrows of the wearer.

The nose front angle and/or splay angle and/or nasal width may be measured using a simple rhinometer, a decimeter, modeling clay and/or 3D scan measurement.

To determine the right location and shape of the nose pad 14, it is preferable to have the frontal angle of the nose and the nasal width.

In a more preferred embodiment, the morphology data provided also comprise splay angle and/or nasal height and/or nasal length and/or cheekbone shape and/or cheekbone position, and/or eyebrows height data.

The morphology data may be measured in an eye care practitioner shop or may be measured online.

The nose pad 14 shape is determined based on the lens shape data and the morphology data.

Once the morphology data are obtained, said data are provided to a lens designer or nose pad designer along with the prescription of the wearer and wearer's wearing conditions and the positioning of the lens with respect to the face of the wearer.

The wearer's wearing conditions and the positioning of the lens with respect to the face of the wearer comprise, for example, the pantoscopic angle and/or the wrap angle and/or fitting height and/or half-pupillary distance.

The wearing conditions may be standard wearing conditions. Standard wearing conditions correspond to a distance between the center of rotation of the eye and the rear face of the ophthalmic lens of 25.5 mm, a distance between the pupil of the eye and the rear face of the ophthalmic lens of 12 mm, a pantoscopic angle of 8 degrees and a wrap angle of 0 degrees.

The pantoscopic angle is the angle in the vertical plane between the optical axis of the ophthalmic lens and the visual axis of the eye in the primary position, usually taken to be the horizontal.

The wrap angle is the angle in the horizontal plane between the optical axis of the spectacle lens and the visual axis of the eye in the primary position, usually taken to be the horizontal.

These additional data enable to further customize the shape of the nose pad 14 taking into consideration ophthalmic lens shape data, ophthalmic lens orientation and the positioning of the ophthalmic lens with respect to the face of the wearer. For example, the pantoscopic angle defines an angle of inclination of the ophthalmic lenses with respect to the face of the wearer. The nose pad 14 is intended to be resting on the nose of the wearer and is intended to be part of the ophthalmic lens 11 according to the disclosure. The nose pad 14 may require considering the pantoscopic angle to define the global shape of the nose pad, the surface from which will protrude the nose pad 14 and the direction into which protrudes the nose pad 14 to ensure a comfortable contact with the nose of the wearer when the ophthalmic lens 11 is worn by the wearer.

According to an embodiment, the contour of the optimized ophthalmic lens 11 may be calculated taking into consideration the wearer's morphology data and the contour of an initial ophthalmic lens. The back surface of the optimized ophthalmic lens 11 may be also calculated taking into consideration the initial ophthalmic lens shape data, morphology data and the contour of the contour of the optimized ophthalmic lens 11. The back surface of the optimized ophthalmic lens 11 may be optimized to comprise or receive the nose pad 14.

The optimized ophthalmic lens 11 global shape is based on global the shape of the initial ophthalmic lens. For example, if the initial ophthalmic lens has sensibly a rectangular shape, the optimized ophthalmic lens 11 would also have sensibly a rectangular shape.

The shape of the initial ophthalmic lens and/or the contour, defining the portion joining the front and the back surfaces configured to be in vicinity of the nose of the wearer when the ophthalmic lens is worn by the wearer, is modified by the shape and contour of the nose pad. This will be further discussed while describing the FIGS. 4a, 4b, 5a and 5b.

Preferably, the contour of the ophthalmic lens 11 comprising a nose pad 14 takes into consideration the morphology data to adapt the size of the ophthalmic lens 11 and prevent a contact between the ophthalmic lens 11 and cheekbones and/or the eyebrows of the wearer.

To determine the positioning of the nose pad 14 on the ophthalmic lens 11, the wearer may wear an eyewear equipment comprising the best existing nose pad positioning with respect to the shape of the wearer's face, and more particularly the nose of the wearer. The eyewear equipment may not necessarily correspond exactly to the shape of the wearer's nose but may be taken into consideration to have a good approximation of fitting parameters of the nose pas 14 to be determined, such as fitting height.

Alternatively, in order to obtain more accurate fitting parameters with respect to a selected eyewear equipment, virtual positioning of the selected eyewear equipment on an image of the wearer face may be considered. To proceed to the virtual positioning of the selected eyewear equipment on the face of the wearer, at least three conditions may be considered:

the selected eyewear equipment is positioned horizontally with respect to a virtual horizontal line joining the wearer eyebrows, the selected eyewear equipment is symmetrically positioned in horizontal direction with respect to a top portion of the nose, the vertical position of the selected eyewear equipment is adjusted so that vertical distance between the datum and the top of the nose equal a target value.

The target value may be for example 4.5 mm. The target value may depend on the selected eyewear equipment, the gender (male, female), the age (child, adult) and the ethnicity (Asians, Caucasians, . . . ) of the wearer.

In an alternative embodiment of the eyewear equipment virtual positioning, the selected eyewear equipment is positioned vertically just under the virtual horizontal line joining the wearer eyebrows.

Advantageously, virtual positioning is easy as it does not require to use and possess the selected eyewear equipment to determine the shape of the nose pad 14.

The virtual positioning may be used after the wearer is provided with the eyewear equipment comprising the best existing nose pad positioning with respect to the shape of the wearer's face, and more particularly the nose of the wearer. The good approximation of fitting parameters such as fitting height may become even more accurate.

The shape of the nose pad 14 is determined in order to have a balance of the ophthalmic lens 11 on the wearer's face when the lens 11 is worn by the wearer, and wherein the balanced ophthalmic lens 11 is substantially horizontal.

FIG. 3 illustrates an eyewear equipment 30 comprising a first and a second ophthalmic lens 11a, 11b according to the disclosure. The first and second ophthalmic lenses 11a, 11b comprise respectively a nose pad 34 protruding from the nasal portion 33 and the back surface 32 of the lenses. The nose pads 34 are configured to rest on the nose of the wearer. The nose pad 34 comprise a nasal portion 35 being flush with the nasal portion 33, of the ophthalmic lens 11, to form a continuous surface fitting the nose of the wearer. Thus, the frame design complexity can be reduced as the contact with respect to the nose of the wearer is no longer considered in the frame design.

The eyewear equipment 30 comprises a frame 31 free of nose pad. The frame 31 comprises a first temple 31a and a second temple 31b being respectively fixed to a temporal end of the first and the second ophthalmic lens 11a, 11b. The frame 31 comprises also a connecting rod 31c fixed to the first and second lenses 11a, 11b. The connecting rod 31c solely acts as a connecting element between the first and the second ophthalmic lenses 11a, 11b. This connecting rod 31c is no longer constrained to a specific shape to form the nose pads or to carry deported nose pads. The manufacturing process to produce eyewear equipment comprising half-rim or rimless frames is facilitated. The connecting rod 31 may have any shape, for example the connecting rod may be straight, bent or curved.

Using ophthalmic lenses 11 according to the disclosure, it is no longer required to produce complicated frames forming nose pads or comprising deported nose pads comprising an arm fixed on the lens or the frame.

Using ophthalmic lenses 11 according to the disclosure enables to provide an eyewear equipment rightly fitted with respect to the wearer face without requiring a complex frame design or a large number of pieces to form deported nose pad and their respective stock. Half-rim or rimless frames solely require a connecting rod 31c connecting the two ophthalmic lenses 11a, 11b of the eyewear equipment.

FIGS. 4a, 4b, 5a and 5b illustrate an initial ophthalmic lens 41, 61, the ophthalmic lens 51, 71 comprising a modified contour 55, 75 with respect to the contour of the initial ophthalmic lens 41, 61, wherein the nasal portion is modified to provide at least a part of the nasal portion 53, 73 in contact with the nose N of the wearer. The at least part of the nasal portion forms the nose pad 54, 74 designed to be fitted on the nose of the wearer.

Figures 4A, 4B:
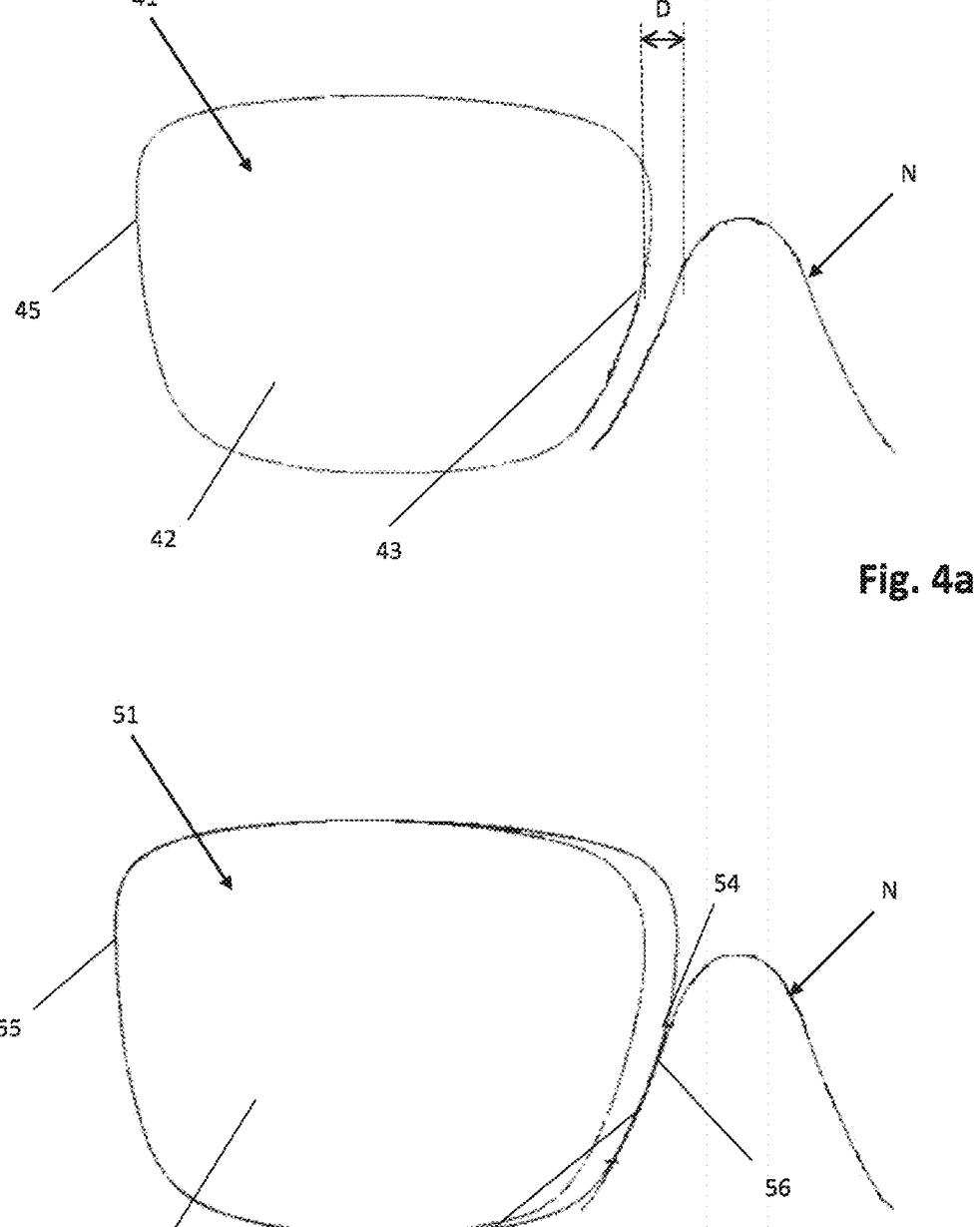
FIG. 4a is an illustration of an initial ophthalmic lens.
FIG. 4b is an illustration of an optimized ophthalmic lens comprising a nose pad according to the disclosure according to a first embodiment.

FIG. 4a illustrates an initial ophthalmic lens 41. The initial ophthalmic lens 41 comprises a front surface 42 and a nasal portion 43. The initial ophthalmic lens 41 has a contour 45.

FIG. 4a also illustrates the nose N of the wearer. The nose N is spaced from the nasal portion 43 of the initial ophthalmic lens 41 by a distance D. In this embodiment the initial ophthalmic lens 41 requires a deported nose pad (3 in FIG. 1) or a frame housing the initial ophthalmic lens 41 comprising a nose pad to enable the eyewear equipment comprising the initial ophthalmic lens 41 to rest on the node of the wearer.

FIG. 4b illustrates an optimized ophthalmic lens 51. The optimized ophthalmic lens 51 comprises a front surface 52 and a nasal portion 53. The optimized ophthalmic lens 51 has a contour 55.

The contour 55 of the optimized ophthalmic lens 51 is modified with respect to the contour 45 of the initial ophthalmic lens 41. The nasal portion 53 has been extended from the top to the bottom of the optimized ophthalmic lens 51 in direction of the nose N of the wearer for the distance D shown in FIG. 4a without changing the global shape of the initial ophthalmic lens 41. The nasal portion 53 has been extended in order to form a nose pad 54 resting on the nose N of the wearer. The nose pad 54 forms a tangent to the nose splay angle.

The nose pad 54 is extending on the nasal formation 53 from the front surface 52 to the back surface of the optimized ophthalmic lens 51.

The nose pad 54 is particularly advantageous by maximizing the contact surface 56 between the wearer's nose and the nose pad 54 of the optimized ophthalmic lens 51. Maximizing the contact surface enable to improve the comfort of wearing an eyewear equipment.

Figure 5A:
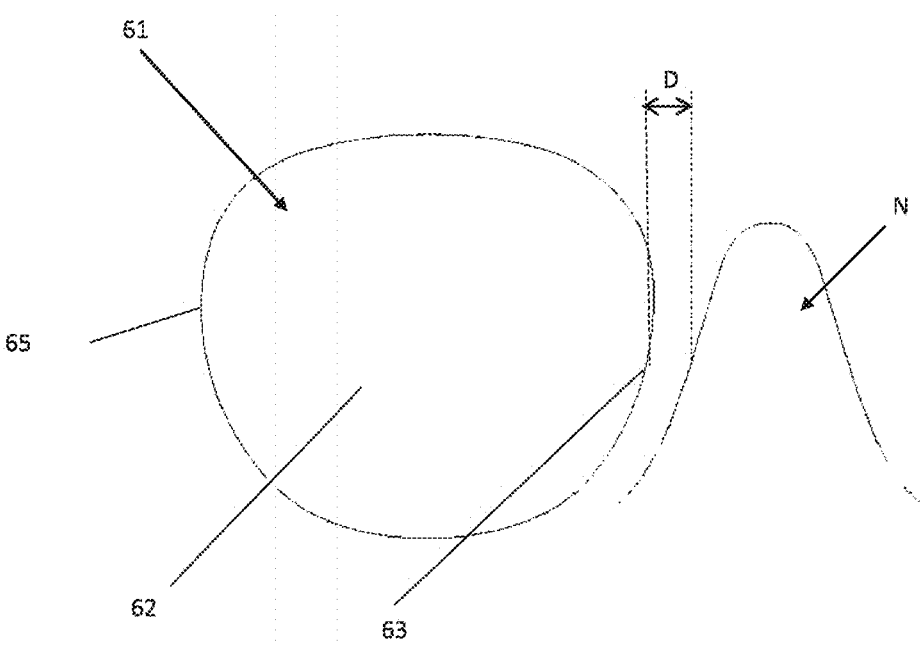
FIG. 5a is an illustration of an initial ophthalmic lens.

FIG. 5a illustrates an initial ophthalmic lens 61. The initial ophthalmic lens 61 comprises a front surface 62 and a nasal portion 63. The initial ophthalmic lens 61 has a contour 65.

FIG. 5a also illustrates the nose N of the wearer. The nose N is spaced from the nasal portion 63 of the initial ophthalmic lens 61 by a distance D. In this embodiment the initial ophthalmic lens 61 requires a deported nose pad (3 in FIG. 1) or a frame housing the initial ophthalmic lens 61 comprising a nose pad to enable the eyewear equipment comprising the initial ophthalmic lens 61 to rest on the node of the wearer.

Figure 5B:
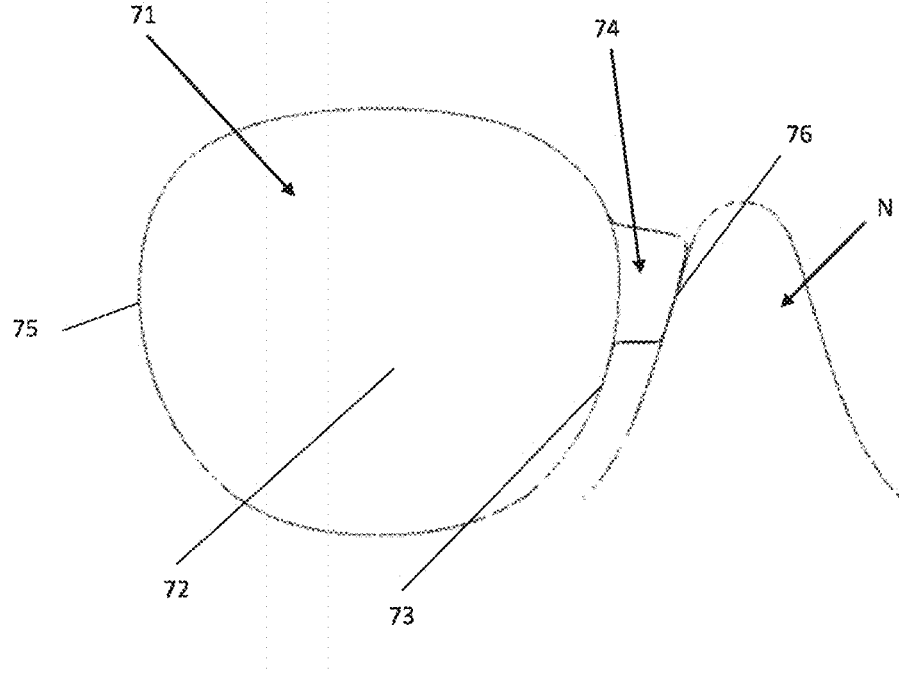
FIG. 5b is an illustration of an optimized ophthalmic lens comprising a nose pad according to the disclosure according to a second embodiment.

FIG. 5b illustrates an optimized ophthalmic lens 71. The optimized ophthalmic lens 71 comprises a front surface 72 and a nasal portion 73. The optimized ophthalmic lens 51 has a contour 75.

The contour 75 of the optimized ophthalmic lens 71 is modified with respect to the contour 65 of the initial ophthalmic lens 61. A portion of the nasal portion 73 of the optimized ophthalmic lens 71 has been extended in direction of the nose N of the wearer for the distance D shown in FIG. 5a. The portion of the nasal portion 73 extending in direction of the nose of the wearer forms a nose pad 74 resting on the nose N of the wearer. The contact surface 76 of the nose pad 74 with the nose N of the wearer has to be smooth and extend in a direction close of the to the splay angle.

Ideally, the final shape of the nose pad 74 may be considered to determine the back surface of the optimized ophthalmic lens 71.

Advantageously, the embodiment of FIG. 5b enables to keep the t shape of the initial ophthalmic lens 61. This embodiment enables to require less glass material with respect to the embodiment of FIG. 4b to manufacture an ophthalmic lens 11 according to the disclosure.

After having disclosed embodiments of an ophthalmic lens 11 according to the disclosure comprising a nose pad extending from the back surface 12 as illustrated in FIG. 2 or the nasal portion 53, 73 as shown in figure in FIGS. 4b and 5b, it will now be discussed the method to manufacture a nose pad 14 according to the disclosure.

According to a first manufacturing embodiment, the lens may be obtained by digital surfacing.

The manufacturing method comprise a data acquisition step wherein data regarding the lens are acquired such as substrate material, the wearer's prescription, the lens diameter. Additional data regarding the nose-pad (shape type, . . . ), the frame of the eyewear equipment and the wearer's morphology data.

Based on this acquired data, the contour of the optimized ophthalmic lens 11 and the shape of the nose pad 14 are determined.

Once the final design of the optimized ophthalmic lens 11 is defined the lens is manufactured using a lens blank. The optimized ophthalmic lens 11 is machining a lens blank using a poly crystalline diamond tool. The manufacturing step comprises a polishing step wherein the surfaced of the lens are polished.

In preferred embodiment additional option may be provided to the optimized ophthalmic lens 11 via application of films or coatings, for example to filter the blue light.

In an embodiment, the optimized ophthalmic lens 11 and the nose pad are obtained through molding. This embodiment is preferred when the ophthalmic lens 11 comprises a nose pad 14 selected within a list of predetermined nose pads. For example, a database may comprise a list of at least two predetermined nose pads, preferably at least five predetermined nose pads determined based on the standard morphologic data relative to the age and/or the gender and/or the wearer. The molded ophthalmic lens 11 comprises one molded predetermined nose pad selected within the database.

Finally, the optimized ophthalmic lens 11 is mounted into the frame of the eyewear equipment.

In alternative manufacturing processes for obtaining the optimized ophthalmic lens 11, additive manufacturing may be considered.

In a first particular embodiment of the manufacturing process, the whole optimized ophthalmic lens 11 is obtained by additive printing. Preferably the additive printing is DLP-stereolithography (SLA).

The manufacturing method comprise a data acquisition step wherein data regarding the lens are acquired such as substrate material, the wearer's prescription, the lens diameter. Additional da regarding the nose-pad (shape type, . . . ), the frame of the eyewear equipment and the wearer's morphology data.

Based on this acquired data, the contour of the optimized ophthalmic lens 11 and the shape of the nose 14 pad are determined.

Once the design of the optimized ophthalmic lens 11 and the shape of the nose 14 pad are determined, the optimized ophthalmic lens 11, including the nose pad is printed layers by layers 80.

Once the optimized ophthalmic lens 11 is printed, postprinting operations occurs such as surfacing and edging to ensure that each surface of the optimized ophthalmic lens 11 is smooth. It is particularly advantageous that the nasal portion 15 of the nose pad 14 is smooth to be fitted on the nose of the wearer.

In a particular the nose pad 14 may be formed integrally with the optimized ophthalmic lens 11. The ophthalmic lens 11 intended to be worn by the wearer and the nose pad are manufactured as a one-piece element.

Preferable the lens is printed on supports 81 to be removed once the printing is over.

In a second particular embodiment of the manufacturing process, a finished ophthalmic lens 90 is provided. A finished ophthalmic lens 90 means an ophthalmic lens adapted to the prescription and the wearer's wearing conditions of the wearer. The finished ophthalmic lens 90 may be obtained by molding, die cutting, additive printing or any other manufacturing process.

In this embodiment, the nose pad 94 is manufactured by additive printing on the back surface 92 of the finished ophthalmic lens 90. The nose pad 94 is printed directly on the finished ophthalmic lens 90.

Preferably, a back surface 92 preparation may be useful for adhesion of the layers of the printed nose pad 94 on the lens 90. The back surface 92 preparation may be a plasma treatment, or a deposition of an additive layer of adhesion.

The finished ophthalmic lens 90 provided with the nose pad forms an ophthalmic lens according to the disclosure.

To proceed to the printing of the nose pad, we may use material jetting (Inkjet). The material, forming the nose pad 94, is projected drops by drops using a 3D printer printing head. The material may be immediately cured using an energy source, being preferably UV lighting.

In a third particular embodiment of the manufacturing process, a finished ophthalmic lens 100 is provided. A finished ophthalmic lens 100 means an ophthalmic lens adapted to the prescription and the wearer's wearing conditions of the wearer. The finished ophthalmic lens 100 may be by obtained by molding, die casting, additive printing or any other manufacturing process.

In this embodiment, alike the second particular embodiment of the manufacturing process, a nose pad 104 is manufactured by additive printing. However, the nose pad 104 is printed without requiring the finished ophthalmic lens 100.

Figure 6A:
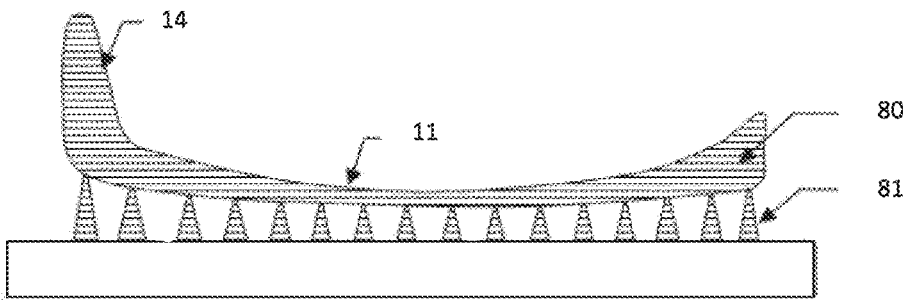
FIGS. 6a to 6c illustrate an ophthalmic lens comprising a nose pad according to the disclosure manufactured according to a first, a second and a third embodiments.
Figure 6B:
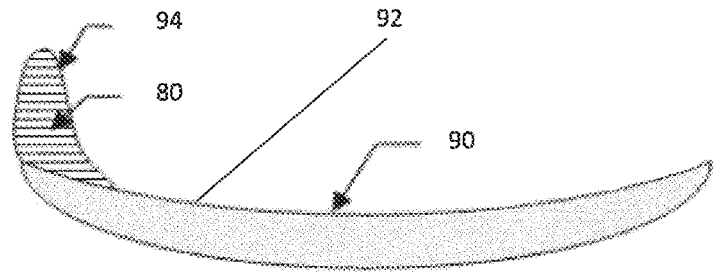
Figure 6C:
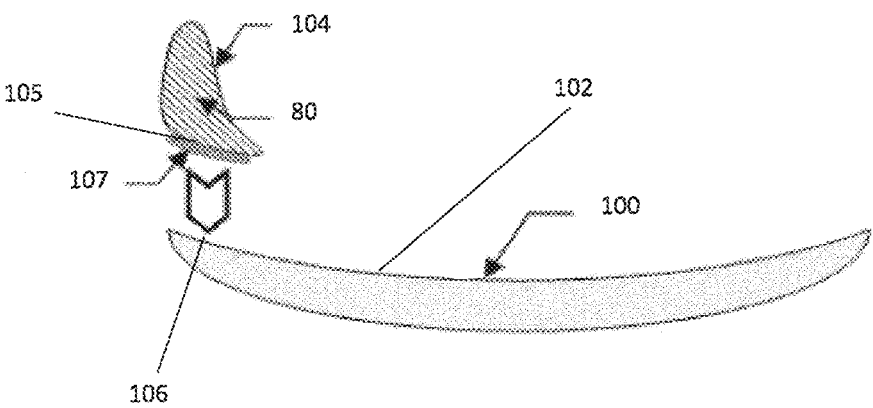

The manufacturing process comprise a fixation step, wherein the nose pad is fixed to a surface of the finished ophthalmic lens 100 to form an ophthalmic lens according to the disclosure. FIG. 6c illustrates a nose pad 104 fixed on the finished ophthalmic lens 100 on its back surface 102. The nose pad 104 comprises a nose pad fixation portion 105, which is determined to be fixed on a receiving portion 106 of the ophthalmic lens 11 intended to be worn by the wearer.

Preferably, the nose pad fixation portion 105 has a shape determined to be complementary with the shape of the receiving portion 106 of the finished ophthalmic lens 100 intended to be worn by the wearer.

Advantageously, the shape complementarity enables a good fixation of the nose pad on the ophthalmic lens.

Preferably the fixation step is obtained by applying fixation means 107 such as glue on the nose pad fixation portion 105. More preferably the fixation step comprises pressing the nose pad 104 onto which the fixation mean has been applied the receiving portion 106 of the finished ophthalmic lens 100 and/or using light and/or thermal activation.

In an embodiment, prior to the fixation step, the surface of the finished ophthalmic lens 100 designed to receive the nose pad 104 undergo a surface treatment in order to have smooth surface enabling a correct fixation of the nose pad on the finished ophthalmic lens 100.

As disclose in the second and particular embodiments of the manufacturing process, the nose pad 94, 104 may be formed on a portion of the finished ophthalmic lens 100. In these embodiments, the nose pad 94, 104 is obtained by additive printing, but the nose pad may be manufactured according to another manufacturing process such as molding or die casting. Regardless of the manufacturing process to obtain the nose pad mentioned in the paragraph, the nose pad 94, 104 is manufactured successively of the finished ophthalmic lens 90, 100 intended to be worn by the wearer, finished ophthalmic lens 90, 100 being manufactured independently of the nose pad.

In a particular embodiment, the shape of the nose pad 14 shape is selected among within a list of predetermined nose pad shapes based on the wearer's morphology data. The predetermined nose pad shapes are standard nose pad shapes stored on a database.

For example, a database may comprise a list of at least two predetermined nose pads, preferably at least five predetermined nose pads determined based on the standard morphologic data relative to the age and/or the gender and/or the wearer.

Advantageously, the use of predetermined shapes of nose pad enable to have a cheaper and faster ophthalmic lens manufacturing process.

Once the shape of the nose pad 14 is determined, the nose pad may be formed on an ophthalmic lens to form the ophthalmic lens according to the disclosure.

In a particular embodiment, the nose pad 14 and the optimized ophthalmic lens are made of the same material.

In another particular embodiment, wherein the nose pad 14 and the ophthalmic lens 11 have the same colored tint.

The disclosure has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. A method for determining a shape of a nose pad to be part of an optimized ophthalmic lens configured to be worn by a wearer, the method comprising:

receiving initial lens shape data relating at least to a shape of an initial ophthalmic lens free of an initial nose pad;

receiving morphology data relating at least to a morphology of the nose of the wearer;

determining the shape of the nose pad configured to be part of the optimized ophthalmic lens configured to be worn by the wearer based at least on the initial lens shape data and morphology data; and determining an optimized ophthalmic lens shape of the optimized ophthalmic lens based on the initial lens shape data of the initial ophthalmic lens free of the initial nose pad, the optimized ophthalmic lens comprising the nose pad.

2. The method according to claim 1, wherein the morphology data comprise one or more of:
    a nose front angle,
    a splay angle,
    a nasal width,
    a nasal height,
    a nasal length,
    a cheekbone shape,
    a cheekbone position, and
    eyebrows height data.

3. The method according to claim 1, further comprising: receiving wearing conditions of the wearer.

4. The method according to claim 3, wherein the wearing conditions of the wearer comprise one or more of: (i) pantoscopic angle or eye-lens distance, and (ii) the positioning of the lens with respect to the face of the wearer.

5. The method according to claim 1, wherein the nose pad is configured to be formed integrally with the optimized ophthalmic lens.

6. The method according to claim 1, wherein the nose pad is configured to be formed on a portion of the optimized ophthalmic lens.

7. The method according to claim 1, wherein the shape of the nose pad is selected within a list of predetermined nose pad shapes based on the morphology data of the wearer.

8. The method according to claim 1, wherein the initial lens shape data comprises one or more of:
    a contour of the initial ophthalmic lens defining a portion joining a front surface and a back surface of the initial ophthalmic lens over a perimeter of the initial ophthalmic lens,
    a curvature of the back surface of the initial ophthalmic lens, a curvature of the front surface of the initial ophthalmic lens, and
    a shape and a contour of a nasal portion of the initial ophthalmic lens.

9. The method according to claim 1, wherein one or more of the shape of the initial ophthalmic lens and the contour, defining a portion joining front and the back surfaces configured to be in a vicinity of the nose of the wearer when the ophthalmic lens is worn by the wearer, is modified by the shape and the contour of the nose pad.

10. A method for manufacturing the nose pad comprising:
    determining the shape of the nose pad according to the method of claim 1; and
    manufacturing the nose pad based on the shape of the nose pad determined by said method for determining the shape.

11. An optimized ophthalmic lens configured to be worn by a wearer, the optimized ophthalmic lens comprising:
    a protruding portion forming a nose pad, the protruding portion having a shape defined based on at least wearer morphologic data relating at least to the morphology of the nose of the wearer and initial lens shape data of an initial ophthalmic lens free of an initial nose pad.

12. A nose pad configured to be formed directly on an optimized ophthalmic lens configured to be worn by a wearer, wherein the nose pad is determined based at least on a wearer morphology data and initial lens shape data of an initial ophthalmic lens free of an initial nose pad.

13. The nose pad according to claim 12, wherein the nose pad comprises a fixation portion having a surface configured to have a complementarity shape with a receiving portion of the optimized ophthalmic lens configured to be worn by the wearer.

* * * * *